UNITED STATES PATENT OFFICE.

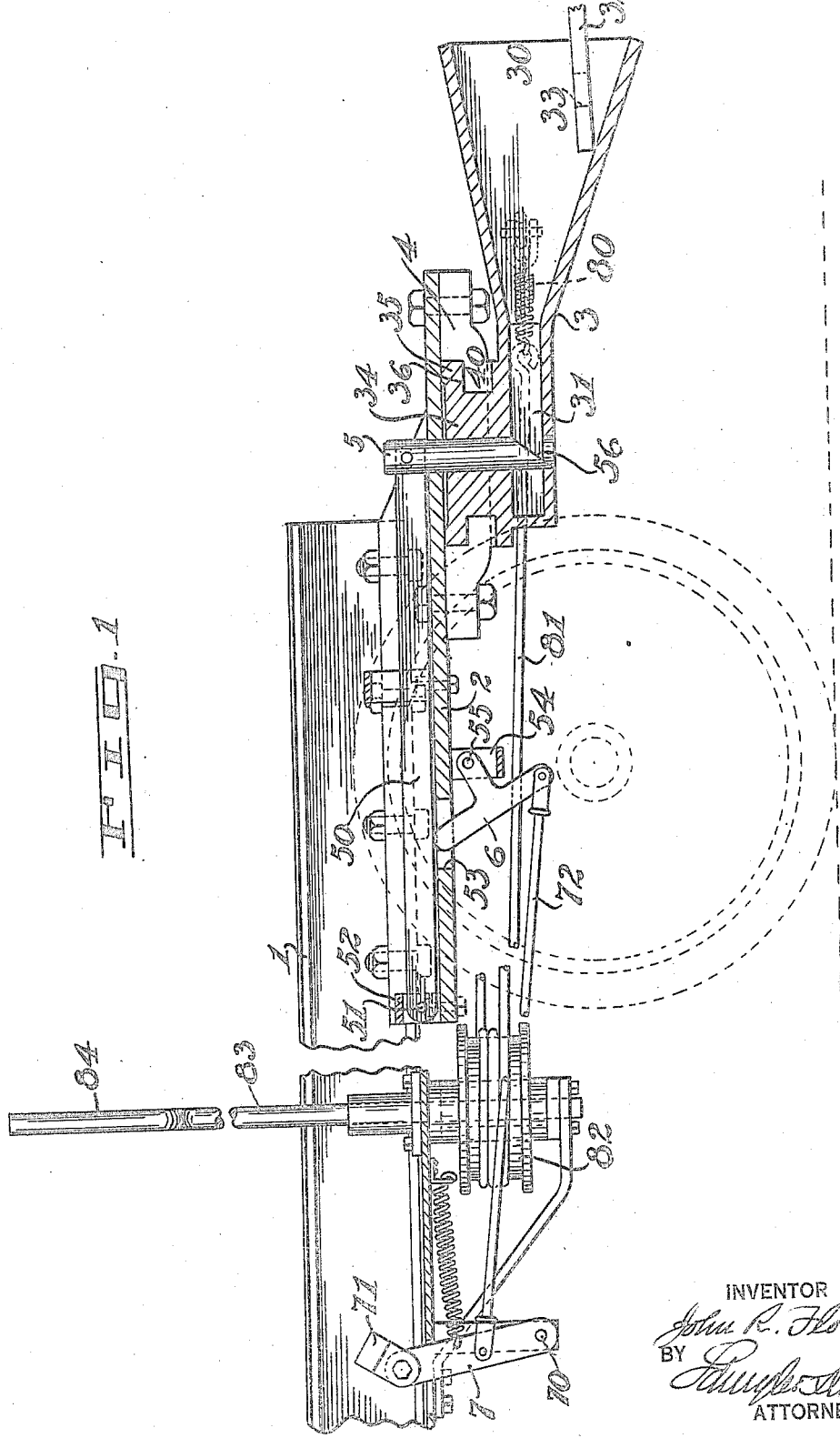

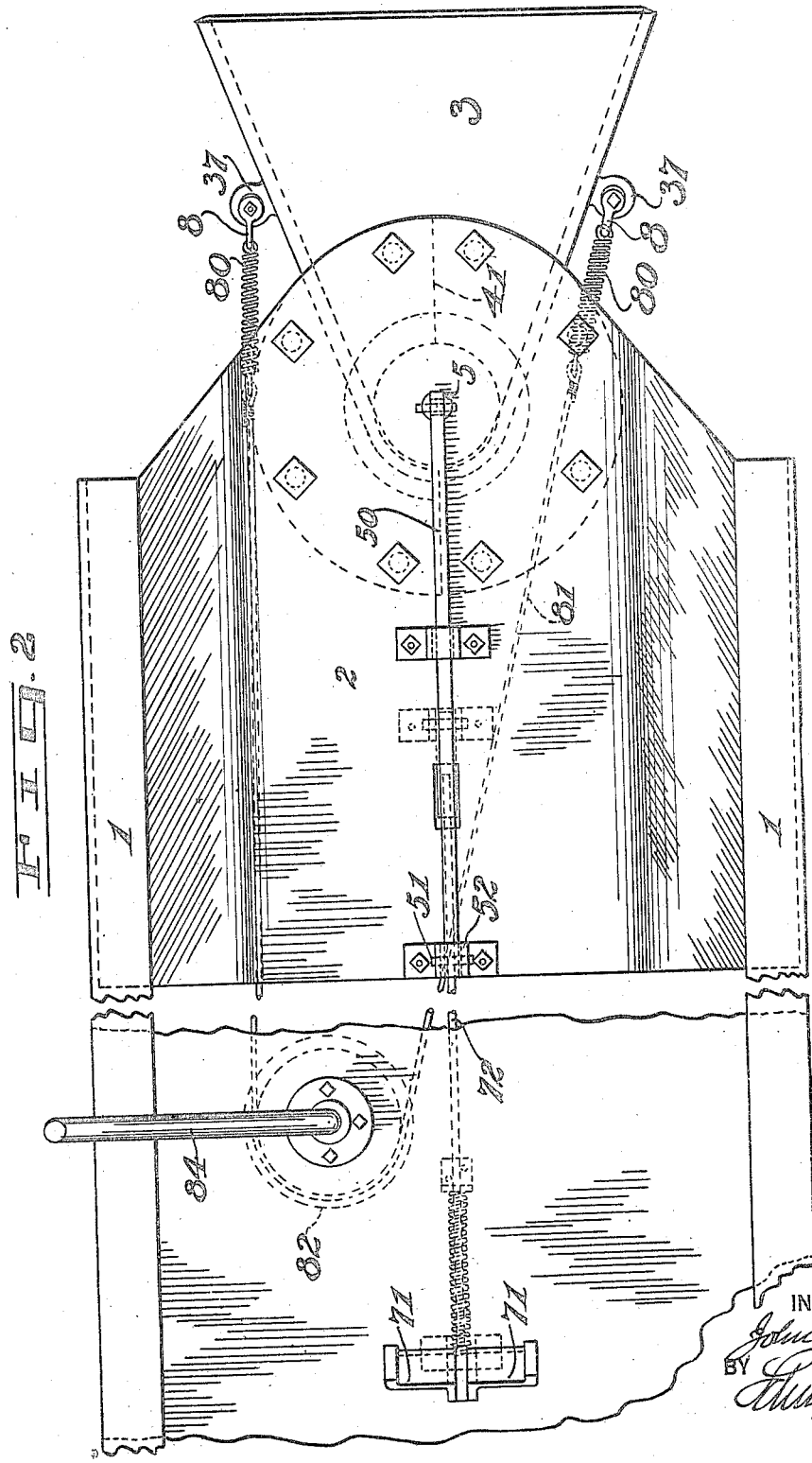

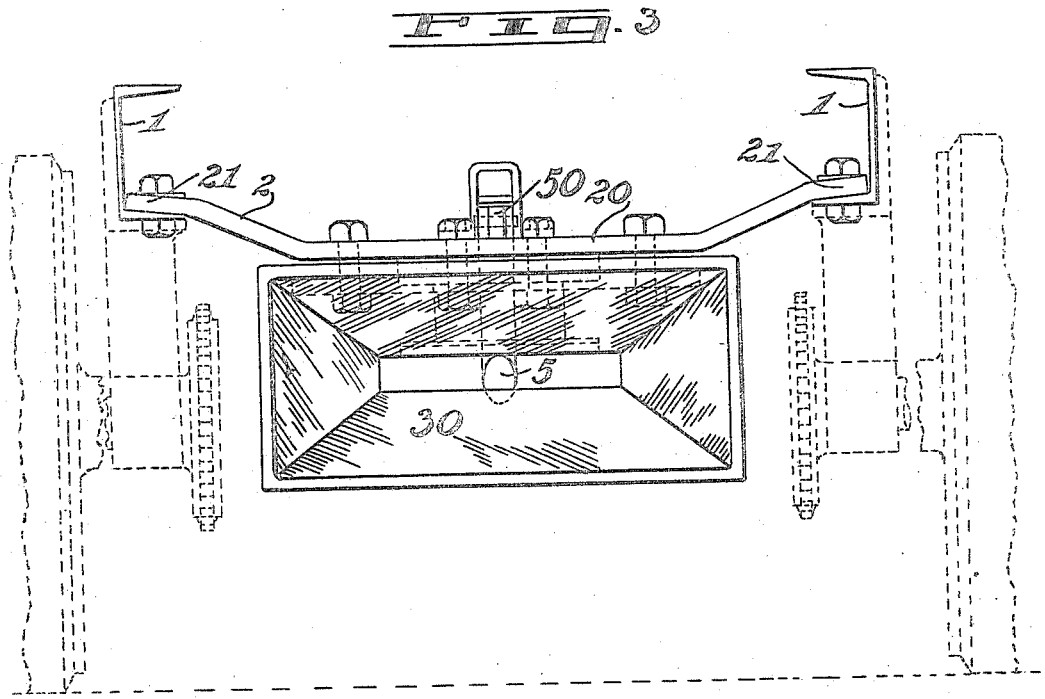
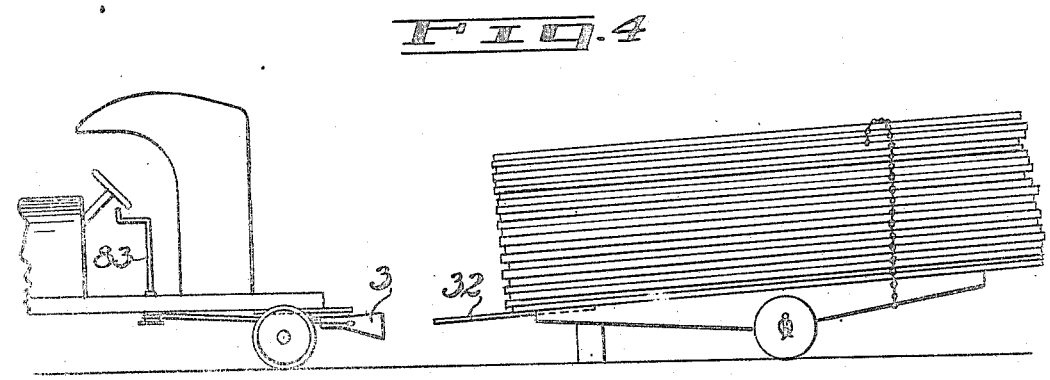

JOHN R. FLOOD, OF EVERETT, WASHINGTON.

AUTOMATIC SWIVEL TRAILER-COUPLING.

1,384,944.

Specification of Letters Patent. Patented July 19, 1921.

Application filed February 16, 1920. Serial No. 359,117.

*To all whom it may concern:*

Be it known that I, JOHN R. FLOOD, a citizen of the United States, residing at Everett, in the county of Snohomish and State of Washington, have invented a new and useful Improvement in Automatic Swivel Trailer-Couplings, of which the following is a specification.

My invention relates to an automatic swivel trailer coupler for the more convenient coupling thereto of trailers.

The object of my invention is, to provide a more convenient and better type of coupling between tractors and trailers and particularly to provide such a coupling which may be controlled in its action and position from the position occupied by the operator of the tractor.

My invention will first be described in the construction illustrated and its principle pointed out and the particular features thereof which are new and for which a patent is desired will then be defined by the claims.

In the accompanying drawings I have shown my invention embodied in the type of construction which I now prefer to use.

Figure 1 is a sectional elevation taken on the plane extending lengthwise of the tractor.

Fig. 2 is a top or plan view of the same parts.

Fig. 3 is a rear end elevation of the coupling and certain of the associated parts of a tractor.

Fig. 4 is a view showing in a diagrammatic character the manner of using the device for coupling up to the lumber buggies or trucks which are commonly employed about mill and lumber yards.

One of the special fields for the use of my invention is upon the type of tractor which is becoming generally used about lumber and mill yards and particularly for connecting such a tractor with the lumber buggies or carts which are used for transporting lumber in the yards. It is evident, however, that the device may be employed for other purposes than this. I will, however, describe it as employed for this particular purpose, as this purpose has been shown in the accompanying illustrations.

In the drawings 1 represents side bars of the chassis or frame of a tractor of the type referred to. Between these parts, at the rear end of the tractor, is secured a plate 2. This plate may be bent so as to have the central portion 20 thereof supported at a slightly lower level than its edges 21. This is, however, a matter largely of convenience and getting the coupling at the right height from the ground.

The coupling proper is supported from the under side of the plate 2. The coupling member carried by the tractor consists of a funnel-shaped member 3 having a mouth 30, which is rectangular in outline. The sloping walls of this part of the coupling converge to a throat 31 which is of such size as to receive the complemental coupling member, herein shown as a bar 32, which is provided at its end with a hole 33 for the reception of the coupling pin.

The inner or forward end of the coupling member 3 is provided with a pivot head 34 which has a flange 35 at its upper edge, thus forming a circular groove 36 into which project flanges 40 of two retaining plates 4. Two of these plates 4 are employed, each representing a half of a complete disk. They are separated along a diameter, as indicated by the dotted line 41 in Fig. 2, and are bolted to the plate 2. This construction securely holds the coupling member 3 and permits free turning thereof in a horizontal plane. At the axis of its rotation it is bored to receive the coupling pin 5. The coupling pin is pivotally connected with a bar 50 which is in turn pivoted at its rear end, as by the pin 51, from the plate 2 in the illustration given, this being secured through the medium of a strap 52 which is secured to the plate 2 and which carries the pivot 51.

At the under side of a plate 2 is a lever 6 which is herein shown as of a T-shape, pivoted by the pin 55 to a U-shaped strap 54 carried by the plate 2. The plate 2 has a slot at 53 which permits passage of one end of the lever 6. This slot is located immediately beneath the lever or bar 50 to which the coupling pin is connected. By swinging the lever 6 in the right direction the bar 50 will be raised carrying with it the coupling pin and freeing the bar 32. This raising of the coupling pin is shown as secured through the means of a lever 7 which is pivoted at a point, as 70, at the forward end of the tractor or at such point that it may easily be acted upon by the operator of the tractor. This lever 7 is provided with two laterally projecting wing-plates 71, which furnish a convenient surface for engagement by the foot of the operator. This lever is connected, as by a rod or cable 72, with the lever 6 which engages the pin raising bar 50.

At each side of the coupling member 3 is shown ears 37 to which is connected a clevis 8 and to this is connected a spring, as 80. To the spring is connected a cable, as 81, which extends to the forward end of the tractor, or to the point where the tractor control is situated. A cable of this sort is connected to each side of the member 3. It is evident that by suitably pulling upon these cables the coupling member 3 may be swung laterally so as to face in different directions. The opposite ends of the cables 81 are secured to a drum or drums, as 82, which has a shaft, as 83, extending upward through the floor of the tractor and provided with a crank arm as 84, by which the drum may be turned to thereby swing the coupling member 3. The use of the spring 80 in the connection is merely to give the connection a certain amount of elasticity, or to permit of a slight yielding. Except for this it would be unnecessary to use the springs.

Fig. 4 illustrates the manner of use of this device for automatically coupling with a lumber buggy or truck. This truck will be supported so that the reach bar 32, by which it is to be hauled, is supported at a level such as to lie between the levels of the upper and lower edges of the mouth of the coupling member 3. As this coupling member has a rather large mouth it is possible for the operator to so manipulate the tractor as to back up to the cart in such position that the coupling bar 32 will enter the flaring mouth of the complemental coupling member 3 and will be forced backward to the bottom thereof. If the coupling pin be held raised while this is being done and then dropped after the bar has entered to the proper position, the trailer will be connected to the tractor. Also if the pin 5 be given a beveled end, as the end 56, shown in Fig. 1, the bar 32 in entering will automatically raise the coupling pin and the pin will then drop into the hole 32 in the bar. When the truck has been delivered to the right place the pin may be raised by the operator of the tractor and the tractor driven away leaving the truck behind.

What I claim as my invention is:—

1. A trailer coupling for tractor vehicles comprising a funnel shaped coupling member pivoted to swing horizontally and provided at its pivot axis with a coupling pin, lines attached to said swinging member and a controlling drum located distant therefrom to which said lines are connected.

2. A trailer coupling for tractor vehicles comprising a funnel shaped coupling member pivoted to swing horizontally and provided at its pivot axis with a coupling pin a bar having pivot connections with the tractor and engaging the coupling pin to raise it, a lifting lever pivoted on the tractor and engaging said first named lever, an operating lever, and a link connecting said operating and lifting levers.

3. A trailer coupling for tractors comprising a funnel shaped coupling member having a flanged pivot head at one side of its inner end, pivot bearing members carried by the tractor chassis and engaging said pivot head, said pivot head having an axial bore which extends through the inner part of the funnel body, a coupling pin movable in said bore, a bar pivoted to said pin and to the chassis, and means for operating said bar to raise the coupling pin.

4. A trailer coupling for tractors comprising a funnel shaped coupling member having a flanged pivot head at one side of its inner end, pivot bearing members carried by the tractor chassis and engaging said pivot head, said pivot head having an axial bore which extends through the inner part of the funnel body, and means for raising said pin operable from the tractor driving position.

5. A trailer coupling for tractor vehicles comprising a bell-mouthed coupling member having a link-receiving channel extending rearwardly from its bell, a laterally projecting pivot head thereon having an axial pin-receiving bore extending through the walls of the link-receiving channel and also having a radially projecting flange at its outer end and bearing plates secured upon the tractor vehicle and flanged to embrace and pivotally support the pivot head of the said coupling member.

JOHN R. FLOOD.